(12) United States Patent
Meijer et al.

(10) Patent No.: US 8,364,751 B2
(45) Date of Patent: Jan. 29, 2013

(54) AUTOMATED CLIENT/SERVER OPERATION PARTITIONING

(75) Inventors: Erik Meijer, Mercer Island, WA (US); Dinesh Chandrakant Kulkarni, Sammamish, WA (US); Matthew J. Warren, Redmond, WA (US); Anders Hejlsberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/145,523

(22) Filed: Jun. 25, 2008

(65) Prior Publication Data

US 2009/0327220 A1 Dec. 31, 2009

(51) Int. Cl.
*G06F 7/06* (2006.01)
*G06F 17/30* (2006.01)
(52) U.S. Cl. ......... 709/203; 717/102; 713/150; 707/203
(58) Field of Classification Search ................. 707/3
See application file for complete search history.

(56) References Cited

U.S. PATENT DOCUMENTS

| | | | |
|---|---|---|---|
| 6,101,481 A * | 8/2000 | Miller | 705/9 |
| 6,151,602 A * | 11/2000 | Hejlsberg et al. | 1/1 |
| 6,473,750 B1 * | 10/2002 | Petculescu et al. | 707/600 |
| 6,560,607 B1 | 5/2003 | Lassesen | |
| 6,567,806 B1 * | 5/2003 | Tsuchida et al. | 1/1 |
| 6,633,846 B1 * | 10/2003 | Bennett et al. | 704/257 |
| 6,782,431 B1 * | 8/2004 | Mukherjee et al. | 709/246 |
| 6,882,993 B1 | 4/2005 | Lawande et al. | |
| 6,898,604 B1 | 5/2005 | Ballinger et al. | |
| 7,107,282 B1 | 9/2006 | Yalamanchi | |
| 7,111,019 B1 * | 9/2006 | Nishizawa et al. | 1/1 |
| 7,164,676 B1 | 1/2007 | Chakraborty | |
| 7,246,114 B2 | 7/2007 | Bolognese et al. | |
| 7,386,778 B2 * | 6/2008 | Udell et al. | 714/738 |

(Continued)

FOREIGN PATENT DOCUMENTS

| EP | 0378367 A2 | 7/1990 |
|---|---|---|
| WO | 2007061430 A1 | 5/2007 |

(Continued)

OTHER PUBLICATIONS

"Expression Trees in LINQ", Copyright 2007, 1 Page http://msdn2.microsoft.com/en-us/library/bb882636.aspx.

(Continued)

*Primary Examiner* — Ashok Patel
*Assistant Examiner* — Andrew Goldberg
(74) *Attorney, Agent, or Firm* — Microsoft Corporation (57) ABSTRACT

An operation (such as a relational query) may be processed on a processing engine (such as a relational database server) on behalf of a client. A conventional processing involves the delivery of the operation to the processing engine, which executes the entire operation to completion and returns a result data set. It may be more efficient to allocate part of the operation to be performed on the client, but a developer may be unable or unavailable to rewrite the operation in a distributed manner. Instead, the operation may be automatically partitioned into a pre-engine client portion, a processing engine portion, and a client portion, and the instructions of each portion may be automatically allocated respectively to the client, the server, and the client. The partitioning may be adjusted to conserve computing resources, such as bandwidth and storage, and the instructions may be reordered to improve the processing of the operation.

13 Claims, 7 Drawing Sheets

U.S. PATENT DOCUMENTS

| | | | |
|---|---|---|---|
| 7,721,290 B2* | 5/2010 | Horikawa | 718/104 |
| 2001/0049685 A1* | 12/2001 | Carey et al. | 707/103 R |
| 2001/0054172 A1 | 12/2001 | Tuatini | |
| 2004/0030679 A1 | 2/2004 | Gonnet | |
| 2004/0073828 A1 | 4/2004 | Bronstein | |
| 2004/0193575 A1 | 9/2004 | Chen et al. | |
| 2004/0194057 A1 | 9/2004 | Schulte et al. | |
| 2004/0194068 A1 | 9/2004 | Warren et al. | |
| 2004/0243799 A1* | 12/2004 | Hacigumus et al. | 713/150 |
| 2004/0267760 A1 | 12/2004 | Brundage et al. | |
| 2005/0097146 A1 | 5/2005 | Konstantinou et al. | |
| 2005/0183071 A1 | 8/2005 | Meijer et al. | |
| 2005/0262124 A1 | 11/2005 | Christensen et al. | |
| 2006/0053159 A1 | 3/2006 | Aridor et al. | |
| 2006/0195421 A1* | 8/2006 | Kilroy | 707/3 |
| 2006/0212418 A1 | 9/2006 | Dettinger et al. | |
| 2006/0253430 A1 | 11/2006 | Fernandes et al. | |
| 2006/0288047 A1 | 12/2006 | Chron et al. | |
| 2006/0294076 A1* | 12/2006 | Mordvinov et al. | 707/3 |
| 2007/0006128 A1 | 1/2007 | Chowdhary et al. | |
| 2007/0006145 A1 | 1/2007 | Hill et al. | |
| 2007/0027849 A1 | 2/2007 | Meijer et al. | |
| 2007/0027905 A1 | 2/2007 | Warren et al. | |
| 2007/0050348 A1 | 3/2007 | Aharoni et al. | |
| 2007/0083807 A1 | 4/2007 | Shaudys et al. | |
| 2007/0130572 A1* | 6/2007 | Gilbert et al. | 719/318 |
| 2007/0174271 A1* | 7/2007 | Mattsson et al. | 707/5 |
| 2007/0174763 A1 | 7/2007 | Chang et al. | |
| 2007/0219973 A1 | 9/2007 | Cui et al. | |
| 2007/0226196 A1 | 9/2007 | Adya et al. | |
| 2007/0226203 A1 | 9/2007 | Adya et al. | |
| 2007/0271233 A1 | 11/2007 | Hejlsberg et al. | |
| 2008/0040334 A1* | 2/2008 | Haber et al. | 707/4 |
| 2009/0019094 A1* | 1/2009 | Lashley et al. | 707/203 |
| 2009/0319496 A1 | 12/2009 | Warren et al. | |
| 2009/0319497 A1 | 12/2009 | Bolognese et al. | |
| 2009/0319498 A1 | 12/2009 | Zabokritski et al. | |
| 2009/0319499 A1 | 12/2009 | Meijer et al. | |
| 2010/0050181 A1* | 2/2010 | Zhang | 718/104 |

FOREIGN PATENT DOCUMENTS

| | | | |
|---|---|---|---|
| WO | WO 2007/061430 A1 | 5/2007 | |

OTHER PUBLICATIONS

Hall Tim, "Bulk Collection of DML Results", Date: 2006, 5 Pages, http://www.dba-oracle.com/plsql/t_plsql_dml.htm.

Hall Tim, "Bulk Update Operations", Date: 2006, 4 Pages, http://www.dba-oracle.com/plsq/t_plsq_bulk_update.htm.

Hejlsberg et al. "The. NET Standard Query Operators", Copyright: 2006, pp. 1-30 http://download.microsoft.com/download/5/8/6/5868081c-68aa-40de-9a45-a3803d8134b8/standard_query_operators.doc.

Kostoulas, et al., "XML Screamer: An Integrated Approach to High Performance XML Parsing, Validation and Deserialization", Proceedings of the 15$^{th}$ international conference on World Wide Web, Date: May 23-26, 2006, pp. 93-102, Publisher: ACM New York, NY, USA.

Meijer Erik, "LINQ 2.0: Democratizing the Cloud", pp. 1-4 http://2007.xtech.org/public/asset/attachment/184.

Meijer et al., "XLinq: XML Programming Refactored (The Return of the Monoids)", 18 Pages, http://research.microsoft.com/~emeijer/Papers/XMLRefactored.html.

"Oracle PL/SQL Programming Guide to Oracle 8i Features", 6 pages, http://www/unix.org.ua/orelly/oracle/guide8i/ch05_02.htm.

"Source and Target Operators", 34 Pages http://download.oracle.com/docs/cd/B31080_01/doc/owb.102/b28223/ref_src_tgt_opers.htm#i1175826.

Box et al. "The LINQ Project .NET Language Integrated Query", Date: May 2006, 31 Pages.

Champion Michael "NET Language-Integrated Query for XML Data", Date: Feb. 2007, pp. 1-27, http://msdn2.microsoft.com/en-us/library/bb308960.aspx.

Expression Trees in LINQ, Copyright 2007, 1 Page http://msdn2.microsoft.com/en-us/library/bb882636.aspx, Dec. 31.

Hall Tim, "Bulk Collection of DML Results", Date: 2006, 5 Pages, http://www.dba-oracle.com/plsql/t_plsql_dml.htm, Dec. 31.

Hall Tim, "Bulk Update Operations", Date: 2006, 4 Pages, http://www.dba-oracle.com/plsq/t$_{13}$ plsql_bulk_update.htm, Dec. 31.

Hejlsberg et al. "The. NET Standard Query Operators", Copyright: 2006, pp. 1-30 http://download.microsoft.com/download/5/8/6/5868081c-68aa-40de-9a45-a3803d8134b8/standard_query_operators.doc, Dec. 31.

Kostoulas, et al., "XML Screamer: An Integrated Approach to High Performance XML Parsing, Validation and Deserialization", Proceedings of the 15th international conference on World Wide Web, Date: May 23-26, 2006, pp. 93-102, Publisher: ACM New York, NY, USA.

Meijer Erik, "LINQ 2.0: Democratizing the Cloud", pp. 1-4 http://2007.xtech.org/public/asset/aaaohment/184, Dec. 31, 2007.

Meijer, et al. "Visual Studio Developer Center", Date: Feb. 2007, pp. 1-7, http://msdn2.microsoft.com/en-us/library/ms364068(VS.80).aspx.

"XQuery Operators", Copyright: 2005-2007, 6 Pages. http://www.xquery.com/tutorials/guided-tour/xquery-operators.html.

U.S. Appl. No. 12/144,630, filed Jun. 24, 2008, Warren et al.
U.S. Appl. No. 12/144,639, filed Jun. 24, 2008, Zabokritski et al.
U.S. Appl. No. 12/144,670, filed Jun. 24, 2008, Torgersen et al.
U.S. Appl. No. 12/145,523, filed Jun. 25, 2008, Meijer et al.

* cited by examiner

AUTOMATED CLIENT/SERVER OPERATION PARTITIONING

BACKGROUND

Many computing scenarios involve the issuing of an operation, such as a query, to a server to be performed on behalf of a client. As one example, a service may accept a relational query to be applied against a data store, and may respond with a message indicating the success or failure of the operation and/or a result data set. Such services may be invoked synchronously (where the client blocks while waiting for the server to complete the service) or asynchronously (where the client continues to perform some other actions while the operation is pending, and where the client is later notified or detects that the operation is complete.) Moreover, the server may concurrently handle many transactions on behalf of one or more clients, and may have access to a finite (though potentially very large) set of resources (e.g., processing bandwidth, memory, and network bandwidth) for performing the queries on behalf of the clients. The taxing of the resources may result in diminished performance and latency in completing such operations; if the queue of operations to be performed grows too large, this may result in failed operations and/or incorrect results.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many scenarios, an operation (such as a query) may involve a series of instructions organized in a particular sequence in order to achieve a desired result. A conventional processing of the query simply involves sending the entire query (e.g., an SQL string specifying a complete query) to the data source, which processes the operations in sequence and returns the result data set to the client. However, this may be inefficient in one or more aspects. As a first example, some portions of the operation may be performable on the client instead of the server, and it may be desirable to allocate some of the processing to the client in order to conserve the resources of the server. As a second example, it may be more efficient to allocate some processing in order to avoid network transport of a considerably large set of data (e.g., if performing an operation on the server involves sending a large amount of data to the server, while processing the operation on the client might involve less consumption of network bandwidth.)

Accordingly, it may be desirable to partition the operation into a sever portion and a client pre-processing portion performed before the server portion, and/or a client post-processing portion performed after the server portion. However, it may be difficult for a developer to partition such operations in an efficient manner (e.g., where the operation is complicated, or where the developer is not privy to the advantages of such reallocation.) Instead, automated techniques may be developed for partitioning the operation in a manner that improves utilization of resources (e.g., by evaluating whether some instructions are more efficiently performed on the server or the client, and accordingly partitioning the operation.) Such techniques may also take into consideration the resources available to the server and client, e.g., the comparative processing load presently allocated to the server and the client, while allocating the partitions of the operation. Moreover, in some scenarios, the partitioning may be enhanced by reconfiguring the sequence of instructions comprising the operation, e.g., in order to permit the allocation to the server of a first instruction notwithstanding the sequencing between the first instruction and a partition boundary of a second instruction that might otherwise preclude the allocation. By automatically partitioning the operation, the server and client may cooperate to improve the efficiency and speed in processing the operation and the utilization of client and server resources.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve the processing of an operation on a server, such as a processing of a database query on a database server, on behalf of a client. The operation often comprises a sequence of instructions to be performed (e.g., a database query involving a selection of attributes from a table, a filtering of the selected attributes based on one or more criteria, a sorting of the attributes according to a sort criterion, and a grouping of attributes according to a category.) In some scenarios, the server may simply perform the instructions on behalf of the client; in other scenarios, the server may notify the client of an operation result; and in still other scenarios, the server may generate a result data set to be returned to the client (e.g., a set of records retrieved from a database in response to the query.)

Figure 1:
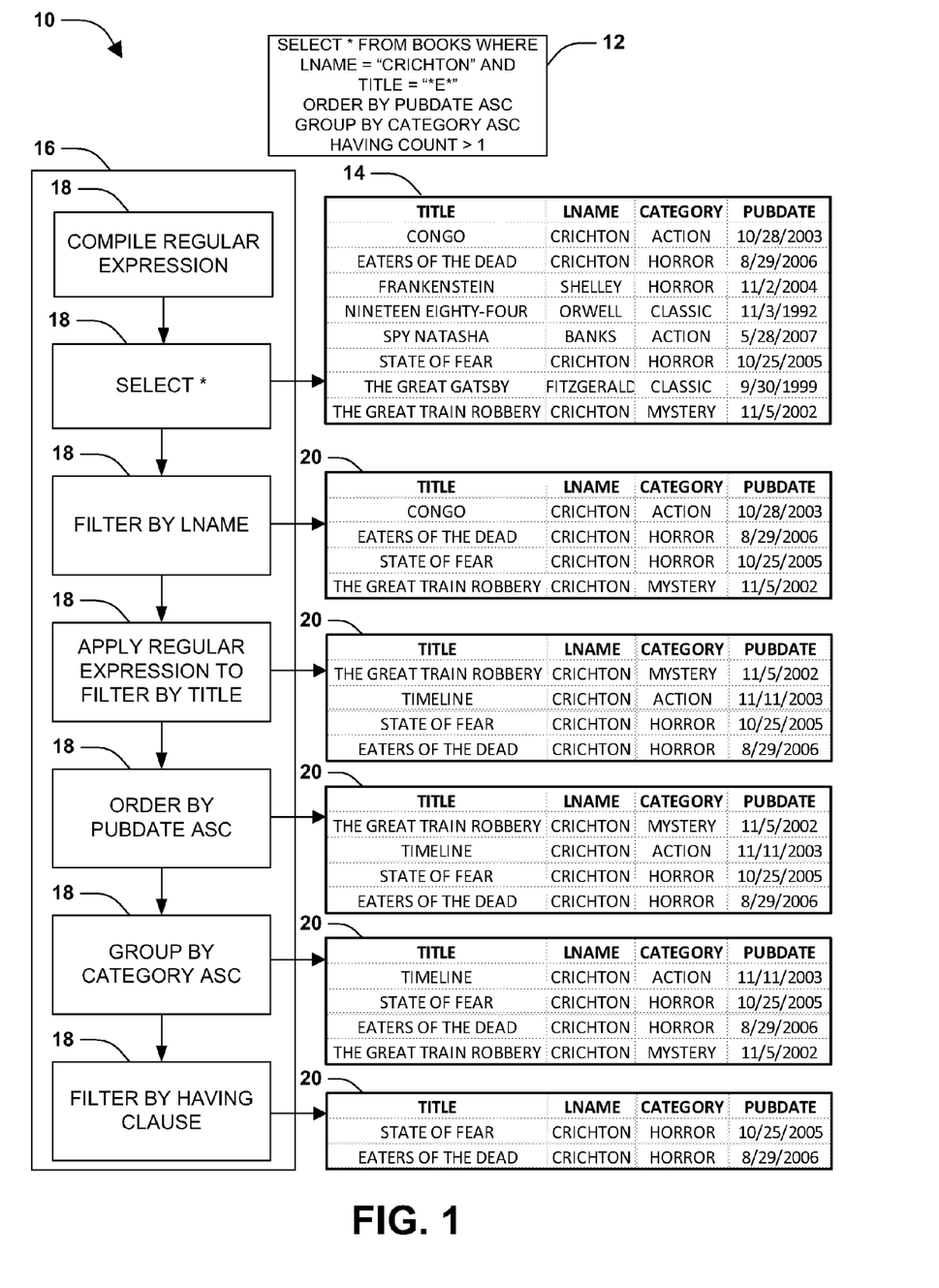
FIG. 1 is an exemplary illustration of a sequence of instructions comprising an operation performed on a data source.

FIG. 1 illustrates an exemplary processing 10 of an operation 12 (in this scenario, a relational query) performed against a data set 14 (in this scenario, some records in a table in a database of books.) The operation 12 may be formulated as an instruction set 16 comprising a sequence of instructions 18 to be applied to a portion of the data set 14 before returning a result data set in order to fulfill the operation 12. The instruction set 16 begins with a compiling of a regular expression utilized in a title-matching instruction, which specifies that only books having titles containing the letter "E" should be selected. Although the compiling might be performed at any stage prior to its use in the operation, it is performed at the beginning of the operation in this exemplary processing 10.

In relation to the data set 14, the instruction set 16 first selects all attributes of all records. The instruction set 16 involves a filtering of the records of the data set 14 according to the last name of the author, such that only books written by authors having a last name of "Crichton" are included (thereby filtering out records specifying authors named Shelley, Orwell, Banks, and Fitzgerald.) Next, the instruction set 16 involves a filtering based on the titles of the books, such that only books with titles containing the letter "E" are selected. This may be performed by applying the compiled regular expression to the "TITLE" field of the records not yet filtered out of the data set 12, and results in a selection of four records (and a filtering out of the book entitled "CONGO".) Next, the instruction set 16 involves a sorting based on the "PUBDATE" field of the records, which sorts the remaining records of the data set 12 in an ascending order. Next, the instruction set 16 involves a grouping of the records according to the "CATEGORY" field, which reorders the records (while still preserving the ordering specified by the sorting; e.g., the book "State of Fear" is sorted before the book "Eaters of the Dead" by the sorting instruction, and remains so ordered when grouped together in the "Horror" category.) Finally, the query involves a filtering based on the grouping, such that only books belonging to a group having more than one record are selected.

The result data set 22 comprises records representing the books "State of Fear" and "Eaters of the Dead" (both of which were published by Crichton, contain an "E" in the title, and are within the category "Horror" which contains two records), and the records are correctly sorted by publication date. This result data set 22 may be returned to the client in response to the relational query.

Figure 2:
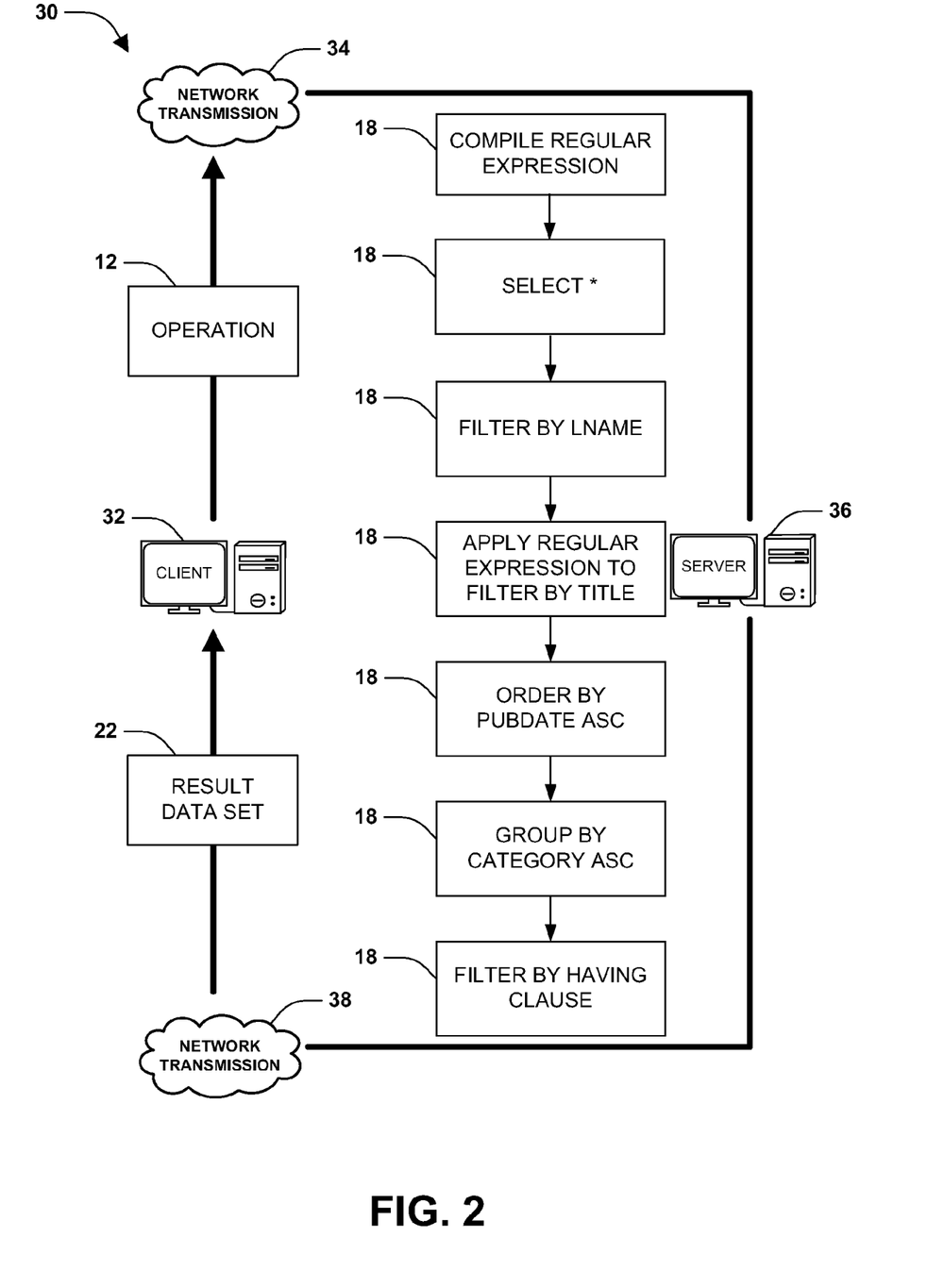
FIG. 2 is an exemplary illustration of a client/server interaction performing the sequence of instructions comprising the operation of FIG. 1.

FIG. 2 illustrates an exemplary interaction 30 whereby an operation is executed by a server 36 on behalf of a client 32. In this exemplary interaction 30, the client 32 initiates the processing by formulating the operation 12 and sending the operation via a first network transmission 34, and is received by the server 36. The server 36 performs the processing of the instructions 18 comprising the operation 12 and returns a result data set 22 to the client 32 via a second network transmission 38. This exemplary interaction 30 features a full-service processing of the operation 12 by the server 36, such that the client 32 simply issues the operation to the server 36 and eventually receives back the result set. However, this processing involves a considerable consumption of resources by the server 36 in performing all of the instructions of the operation, particularly if the data set to which the operation is applied is very large (e.g., if the table of books represents all of the books of a library, possibly numbering in the millions of rows), and/or if the instructions involve a nontrivial amount of processing (e.g., the sorting of a large number of rows in a large result data set, or the compiling of a regular expression and applying to a field a large data set.) Moreover, the server 36 may be tasked with processing many such operations 12 concurrently on behalf of one or more clients. The efficiency with which the server 36 performs and completes the operation may affect the performance of an application on the client 32 that depends on the receipt of the result data set 22. Also, if the server 36 runs low on resources for performing such operations (e.g., processing power, memory or storage space, and/or network bandwidth), the operations may return an incorrect result (e.g., a truncated result data set 22), and may altogether fail to perform the operation and/or to provide a response to the operation. Moreover, it may be undesirable to allocate processing to the server that can be performed on the client, due to the potential risks of remote processing (e.g., due to a network outage, a power outage of the server, interception of packets by an untrusted intermediary, etc.)

Accordingly, it may be desirable to conserve the resources of the server 36 in processing the operations 12 on behalf of one or more clients 32. One technique for conserving resources involves partitioning the operation 12 into portions that may be more efficiently performed on the client 32, or that may be performed either on the server 36 or the client 32 with similar efficiency. The portions of the partitioned operation 12 may therefore be allocated to the client 32 or to the server 36 based on the efficiency of such allocation. Several factors may affect the efficiency of such processing, such as (e.g.) the computing power of the server 36 and client 32; the processing load of the server 36 and the client 32 other than the operation; the memory resources (both volatile and non-volatile) of the server 36 and the client 32; the locations of sets of data utilized by the operation 12; the network capacity of the server 36 and the client 32; and the amount of data to be exchanged over the network while achieving a partitioning.

Figure 3:
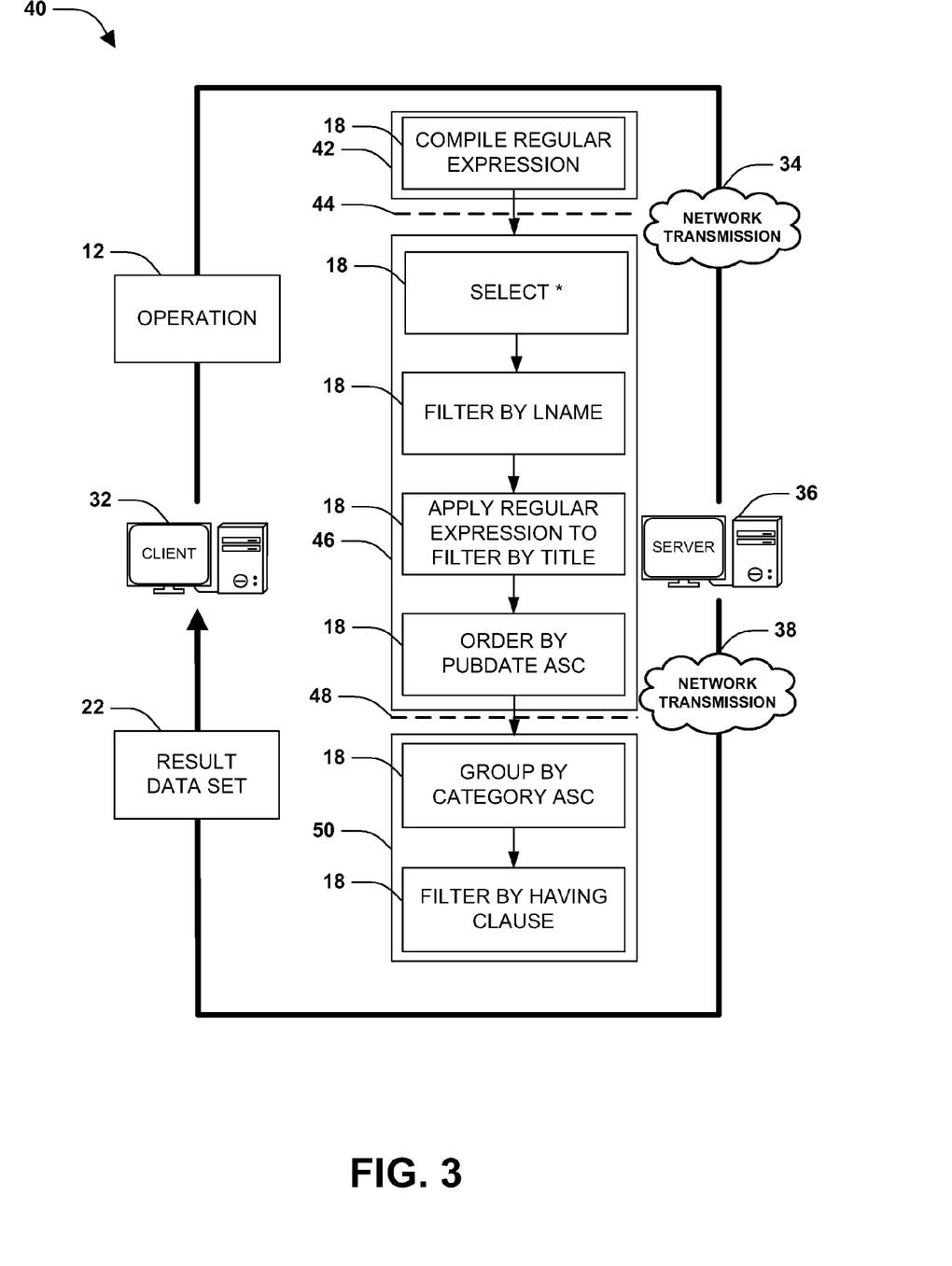
FIG. 3 is another exemplary illustration of a client/server interaction performing the sequence of instructions comprising the operation of FIG. 1.

FIG. 3 illustrates an exemplary partitioning 40 of the operation 12 illustrated in FIGS. 1-2, wherein the operation 12 is partitioned twice. The partitioning of the operation 12 is designed in view of the server 36 operating on the table of books; i.e., the selecting from the table may not be as easily performed on the client 32 as on the server 36. However, preceding and subsequent portions of the operation 12 specify logical transformations of data, which might be performed on either the client 32 or the server 36. Thus, a first partition 44 is devised to create a pre-processing client portion 42, involving the compiling of the regular expression, and a processing engine portion 46, involving the selecting of records and attributes, the filtering by last name, the applying of the regular expression to filter according to the TITLE attribute, and the ordering of the remaining records by publication date. A second partition 48 is also devised to create a post-processing client portion 50 separate from the processing engine portion 46, wherein the former comprising the grouping of the records by category and the filtering based on the "having" clause of the query. In this manner, some parts of the operation 12 may be performed on the server 36 (such as the querying of the database and retrieval of records), while a significant amount of the filtering and organizing of the operation 12 is allocated to the client 32 in the post-processing client portion 50. Other partitionings of the operation 12 are also possible; e.g., the ordering by the PUBDATE attribute could also be allocated to the client 32 by relocating the second partition 48 before this instruction, thereby expanding the post-processing client portion 50 of the partitioned allocation and compacting the processing engine portion 46 of the partitioned allocation.

Figure 4:
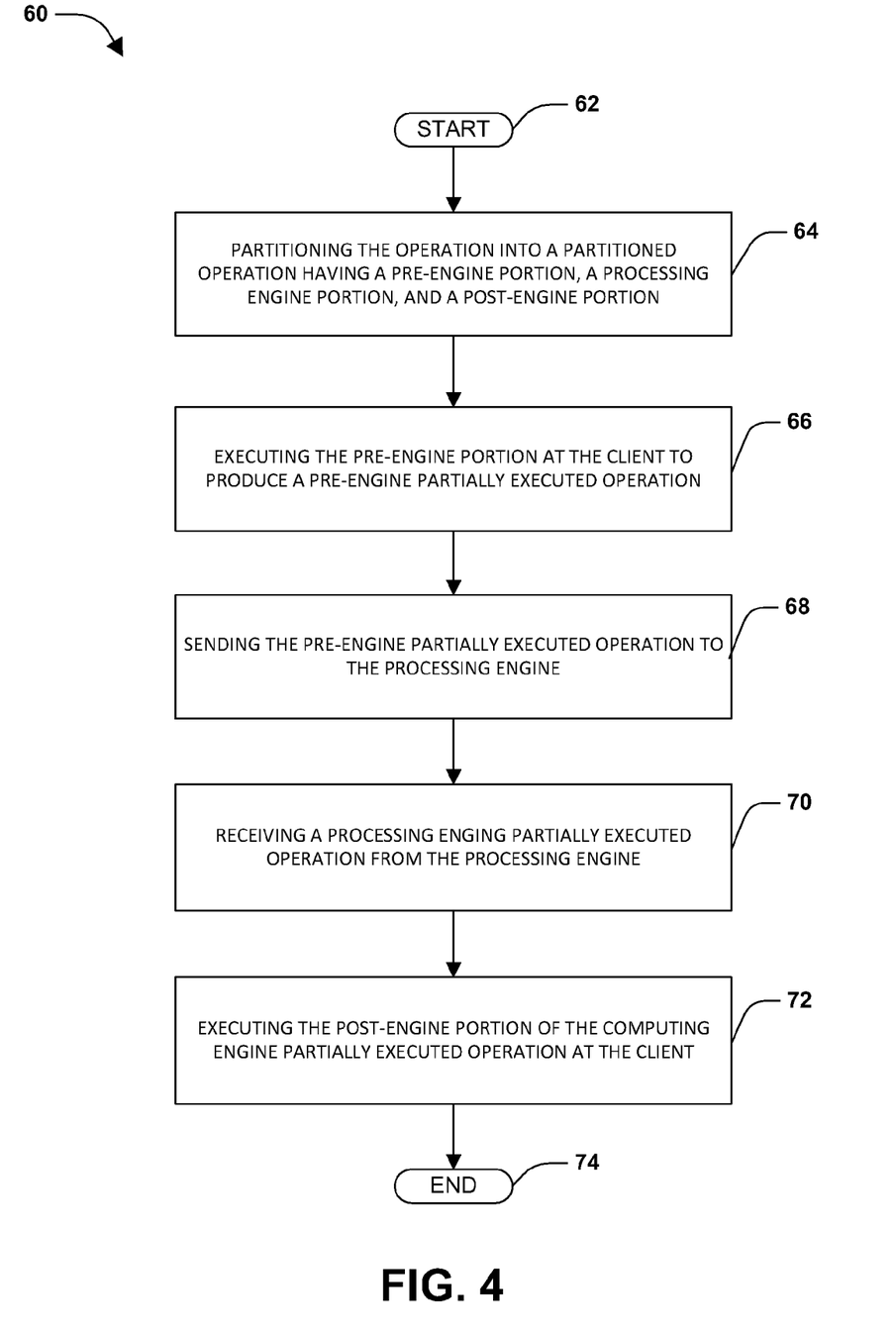
FIG. 4 is a flow chart illustrating an exemplary method of evaluating an operation comprising instructions to be processed by a processing engine for a client.

FIG. 4 illustrates a first embodiment of the techniques illustrated in FIG. 3, the first embodiment comprising an exemplary method 60 of evaluating an operation comprising instructions to be processed by a processing engine for a client. The exemplary method 60 begins at 62 and involves partitioning 64 the operation into a partitioned operation having a pre-engine portion executed by the client, a processing engine portion executed by the processing engine, and a post-engine portion executed by the client. The exemplary method 60 also involves executing 66 the pre-engine portion at the client to produce a pre-engine partially executed operation. The exemplary method 60 also involves sending 68 the pre-engine partially executed operation to the processing engine, and receiving 70 a processing engine partially executed operation from the processing engine after sending the pre-engine partially executed operation. The exemplary method 68 completes the evaluation by executing 72 the post-engine portion of the computing engine partially executed operation at the client to complete the operation execution. Having partitioned the operation into a pre-engine portion, a processing engine portion, and a post-engine portion, and having organized the processing of such partitions (respectively) at the client, the server, and the client, the exemplary method 60 thereby achieves the evaluation of the operation, and so ends at 74.

Figure 5:
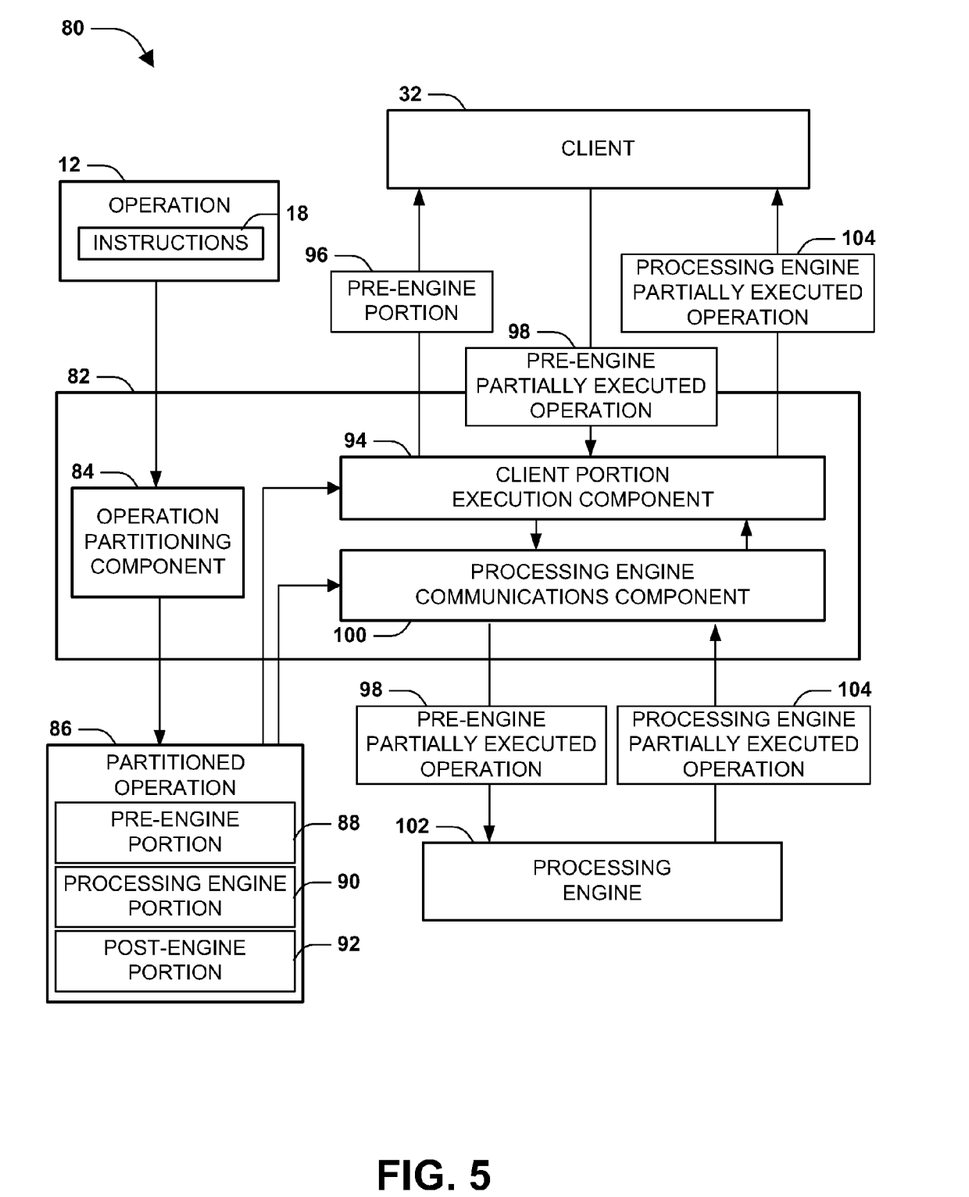
FIG. 5 is a component block diagram illustrating an exemplary system for evaluating an operation comprising instructions to be processed by a processing engine for a client.

FIG. 5 illustrates an exemplary scenario 80 involving the partitioning and processing of an operation 12 through an exemplary system 82 for evaluating the operation 12, whereby the operation 12 comprises instructions 18 to be processed by a processing engine 102 for a client 32. The exemplary system 82 comprises an operation partitioning component 84, which is configured to partition the operation 12 into a partitioned operation 86 having a pre-engine portion 88 executed by the client 32, a processing engine portion 90 executed by the processing engine 102, and a post-engine portion 92 executed by the client 32. The exemplary system 82 also includes a client portion execution component 94, which is configured to execute the pre-engine portion 88 at the client 32 to produce a pre-engine partially executed operation 98, representing the operation 12 having been processed up to the first partition. The exemplary system 82 also includes a processing engine communications component 100, which is configured to send the pre-engine partially executed operation 98 produced by the client portion execution component 94 to the processing engine 102, whereby the processing engine portion 90 of the operation 12 may be performed. Processing engine communications component 100 is also configured, after sending the pre-engine partially executed operation 98 to the processing engine 102, to receive from the processing engine 102 a processing engine partially executed operation 104, representing the operation 12 having been processed up to the second partition. The client portion executing component 94 is also configured to send the processing engine partially executed operation 104 to the client 32 for processing of the post-engine portion 92 of the operation, thereby completing the execution of the operation 12. Having partitioned the operation 12 into a pre-engine portion 88, a processing engine portion 90, and a post-engine portion 92, and having arranged for the processing of such partitioned portions of the operation 12 at (respectively) the client 32, the processing engine 102, and the client 32, the exemplary system 82 thereby achieves the automated partitioning and processing of the operation 12.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary system 82 of FIG. 5) to confer individual and/or synergistic advantages upon such embodiments.

A first aspect that may vary among implementations of these techniques relates to the scenarios in which the automated partitioning of operations may be performed. As a first example, the operation may comprise a query, such as a relational query specified in SQL to be applied against a relational database. Alternatively, the operation may comprise a language-integrated query written in a programming language and designed for application against a queryable data source. The language-integrated query may be transformed into an expression tree (e.g., by an expression tree transforming component included in a system embodiment, such as the exemplary system 82 of FIG. 5.) The nodes of the expression tree may represent the instructions comprising the language-integrated query operation and the sequencing thereof, and may be automatically partitioned between the client and the processing engine. As a second alternative, the operation may comprise a work item issued by a client for processing on a server, such as a high-performance server that is capable of executing many instructions with a high rate of throughput, e.g., through the use of superpipelining, super-parallelism, manycore or multicore processing, a large processor array, a large set of field-programmable gate array (FPGA) devices, and/or quantum computing technologies. Some aspects of the work item may be equivalently performable on the client, and it may be advantageous to perform such processing locally before sending the work item to the server for processing of a more computationally portion of the work item. Those of ordinary skill in the art may devise many types of operations to which the automated partitioning and processing techniques discussed herein may be applied.

A second aspect that may vary among implementations of these techniques relates to the manner of choosing the partitions to allocate the computing either to the client or the processing engine. In many scenarios, at least one instruction may only be performed by the processing engine (e.g., a relational query targeted to a relational database may involve an INSERT, SELECT, UPDATE, or DELETE operation that can only be performed by the processing engine interfacing with the relational database.) However, other instructions of the operation may be performed either on the client or the server hosting the processing engine. For example, in FIG. 3, the instruction 18 of the operation 12 specifying the selecting of all attributes of all records might not be performable on the client 32, but the other instructions 18 of the operation 12 may be performed either on the client 32 or on the server 36.

The partitioning may therefore be selected in many ways. As a first example, the partitioning may be configured to expand portions of the partitioned query executed by one of the client and the processing engine, and to equivalently compact portions of the partitioned query executed by the other of the client and the processing engine, in order to allocate more of the computing burden to either the client or the server than to the other. Such allocating may be based on many factors, such as (e.g.) the processing capacity of the processing engine, the processing capacity of the client, the computational load of the processing engine, the computational load of the client, the storage capacity of the processing engine, the storage capacity of the client, and/or the communications capacity between the processing engine and the client. For example, the sorting of a large number of records according to publication date may be performed either on the client or the server, and the amount of data exchanged over the network does not change based on whether this instruction is allocated either to the server or the client. Accordingly, the automated partitioning may allocate this instruction based on either the predicted availability of processing power of each machine (e.g., if the automated partitioning is performed at compile time), or by comparing the availability processing power of each machine on a just-in-time basis (e.g., if the automated partitioning is performed at runtime.)

As another example, the partitioning may be configured to reduce the size of at least one of the pre-engine partially executed operation and the processing engine partially executed operation. As indicated in FIG. 3, when the processing of the operation 12 reaches the first partition 44 between the pre-processing client portion 42 and the processing engine portion 46, the contents of the partially executed operation are sent to the processing engine (e.g., over a network); and when the processing of the operation 12 reaches the second partition 48 between the processing engine portion 46 and the post-processing client portion 50, the contents of the partially executed operation are sent back to the client 32. The partitioning may be selected in a manner that reduces the amount of data exchanged between the client 32 and the server 36 upon reaching these partitions. In some scenarios, the amount of data exchanged over the network for different partitioning may be known or predicted, and the automated partitioning may be chosen accordingly. However, in other scenarios, it may be difficult to determine a partitioning before the query is actually applied. For example, the application of a regular expression to filter rows may involve two factors: the number of rows to be filtered based on the regular query, and the complexity of the regular expression. A tradeoff analysis may be reviewed of the network transport costs vs. the regular expression computing resources. If the number of rows to be filtered is comparatively small and the regular expression is computationally difficult to evaluate, then it may be advantageous to send the unfiltered set of rows to the client 32 and to allocate the filtering to the client 32 (thereby preserving some processing power of the server 36.) Conversely, if the number of rows to be filtered is very large, the network transport costs may be prohibitive (especially if many of the rows are likely to be filtered out), and it may be more efficient to filter the rows at the server 36, regardless of the computational complexity of applying the regular expression. Those of ordinary skill in the art may devise many techniques for partitioning the operation in view of many factors while implementing the automated partitioning techniques discussed herein.

A third aspect that may vary among implementations relates to a capability for reordering the instructions of the operation to facilitate the processing of the operation, such as to adjust the partitioning of the operation between the client and the processing engine. After the partitioning but before executing the pre-engine portion of the operation, the instructions within the operation may be evaluated to determine whether a more advantageous configuration of instructions might be devised that might improve the processing of the operation, while leading to an equivalent result (i.e., while producing the same logical consequences and outcome of the operation.) For example, a set of instruction adjusting rules may be applied to the operation that specify a relocation of an instruction if certain conditions are met.

A first example of an instruction adjusting rule relates to the compacting of the operation to reduce network traffic upon reaching a partitioning, which involves a sending of the partially executed operation from the client to the processing engine or vice versa. Because network bandwidth is frequently a performance bottleneck when large data sets are involved, it may be advantageous to relocate instructions that compact the operation (e.g., the number of rows or attributes in rows that are currently being handled by the operation) to precede a partitioning and the associated sending of the partially executed operation over a network. Accordingly, an instruction adjusting rule may be formulated that attempts to identify a compacting instruction in the processing engine portion of the query that compacts the processing engine portion, but can be equivalently executed in the pre-engine engine portion; and if such a compacting instruction is identified, the instruction may be moved to the pre-engine engine portion. Another instruction adjusting rule may involve identifying a compacting instruction in the post-engine portion that compacts the post-engine portion and can be equivalently executed in the processing engine portion, and upon identifying such a compacting instruction, moving the instruction to the processing engine portion.

Figure 6:
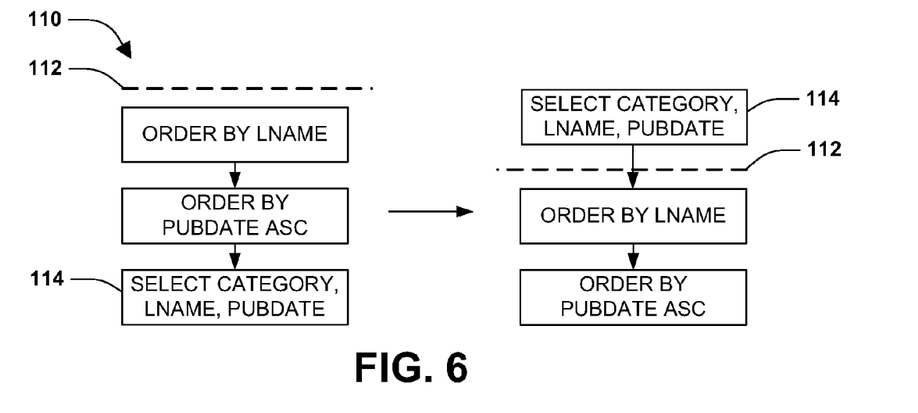
FIG. 6 is an exemplary illustration of a reordering of instructions according to an instruction adjusting rule.

FIG. 6 illustrates one scenario 110 in which such an instruction adjusting rule may be applied, featuring some instructions of an operation that are occurring before a partitioning 112. A compacting instruction 114 may be identified that reduces the attributes selected in a query (thereby eliminating the other attributes that are not of interest.) Because the compacting instruction 114 can be moved to precede the partitioning 112 without compromising the logical outcome of these instructions, an instruction adjusting rule may be applied that relocates the compacting instruction 114 to precede the partitioning 112, thereby conserving network bandwidth that might otherwise have been used to transfer attributes of the associated rows that are not used in the query or returned as part of the query result.

A second example of an instruction adjusting rule relates to a reordering of instructions that improves the economy of processing resources (such as CPU utilization) of the client and/or the processing engine while performing the operation. This reordering may be utilized where the operation includes a computationally intensive instruction that involves a considerable amount of processing, such as the application of a complicated regular expression, a complicated mathematical expression, or an iterative or recursive evaluation. The reordering might also be desirable where a portion of the processing is more efficiently completed on the client rather than the server, or vice versa (e.g., where one machine has better hardware for performing the operation, such as a physics accelerator or FPGA configurable for the operation; where one machine has faster or higher-level access to a data source or object used in the processing; etc.) In some such operations, a compacting instruction may follow the computationally intensive instruction, but can be equivalently executed before the computationally intensive instruction (e.g., where the compacting does not rely on the result of the intensive computation.) In this scenario, an instruction adjusting rule may be applied that moves the compacting operation to precede the computationally intensive instruction, which may reduce the number of records on which the computationally intensive instruction operates, thereby improving the conservation of computing resources.

Figure 7:
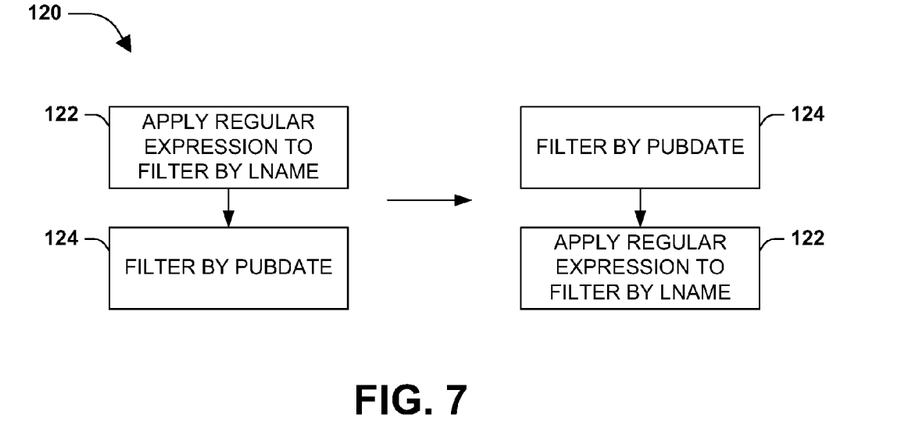
FIG. 7 is another exemplary illustration of a reordering of instructions according to an instruction adjusting rule.

FIG. 7 illustrates an exemplary scenario 120 of a computationally intensive instruction 122 (the application of a regular expression) followed by a compacting instruction 124 that does not depend on the result of the computationally intensive instruction 122. If the compacting instruction 124 is performed first, the computationally intensive instruction 122 may be applied to fewer records. Accordingly, the compacting instruction 124 may be relocated to precede the computationally intensive instruction 122, which may lead to a faster processing time and a reduction of computing power applied to the operation.

A third example of an instruction adjusting rule relates to an execution of an instruction in a particular portion of the operation (e.g., the pre-engine client portion, the processing engine portion, or the post-engine client portion.) While many scenarios may permit the partitioning that so allocates the instruction, in other scenarios it may be difficult to achieve this allocation only through partitioning. For example, an instruction may be desirably performed in the pre-engine client portion of the operation (e.g., if the client has better resources for performing the instruction, such as specialized hardware that can more quickly process the instruction.) However, this instruction may follow another instruction that cannot be relocated to the pre-engine client portion (e.g., an instruction that selects records from a database managed by the processing engine), so the partition between the pre-engine client portion and the processing engine portion cannot be chosen to permit this allocation. However, it may be possible to equivalently execute the instruction in the pre-engine client portion and before the unrelocatable instruction. In this case, the instruction may be moved into the pre-engine client portion and preceding the unrelocatable instruction. Thus, instead of readjusting the partitioning to achieve the desired allocation of the instruction, the instruction may be relocated without compromising the equivalent execution of the operation or relocating the partitions. Similar scenarios may arise where, e.g., an instruction desirably executed by the processing engine is allocated to the post-engine client portion but follows an unrelocatable instruction, or is allocated to the pre-engine client portion but precedes an unrelocatable instruction, or where an instruction in the processing engine portion is desirably executed in the post-engine client portion but precedes an unrelocatable instruction.

Figure 8:
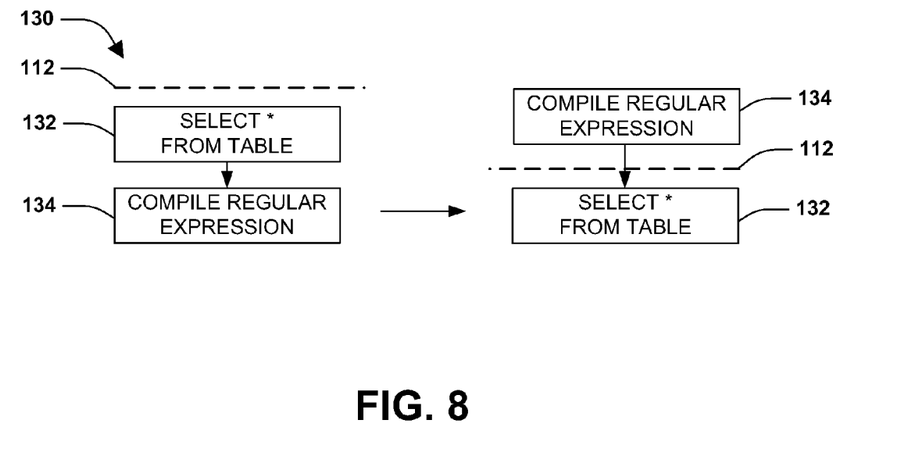
FIG. 8 is still another exemplary illustration of a reordering of instructions according to an instruction adjusting rule.

FIG. 8 illustrates an exemplary scenario 130 involving a partitioning 112 that separates a preceding pre-engine client portion of the operation from a processing engine portion of the operation. The processing engine portion of the operation includes a compiling instruction 134 that may be mildly computationally intensive (e.g., by invoking a compiler), and that is desirably performed by the client in the pre-engine client portion of the operation preceding the partitioning 112. However, the compiling instruction 134 follows an unrelocatable instruction 132 specifying a selecting of data from a table managed by the processing engine, and if the partitioning 112 is relocated past both instructions, the unrelocatable instruction 132 will be allocated to the client and unable to complete. However, the compiling instruction 134 may be equivalently executed in the pre-client portion 134 and may precede the unrelocatable instruction 132 without compromising the logical results of the operation. (Indeed, the compiled regular expression may be more compact than the fully specified regular expression, so this relocation may also improve network utilization.) Therefore, an instruction adjusting rule may be applied to move the compiling instruction 134 into the pre-engine client portion of the operation preceding the partitioning 112 to improve the processing of the operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
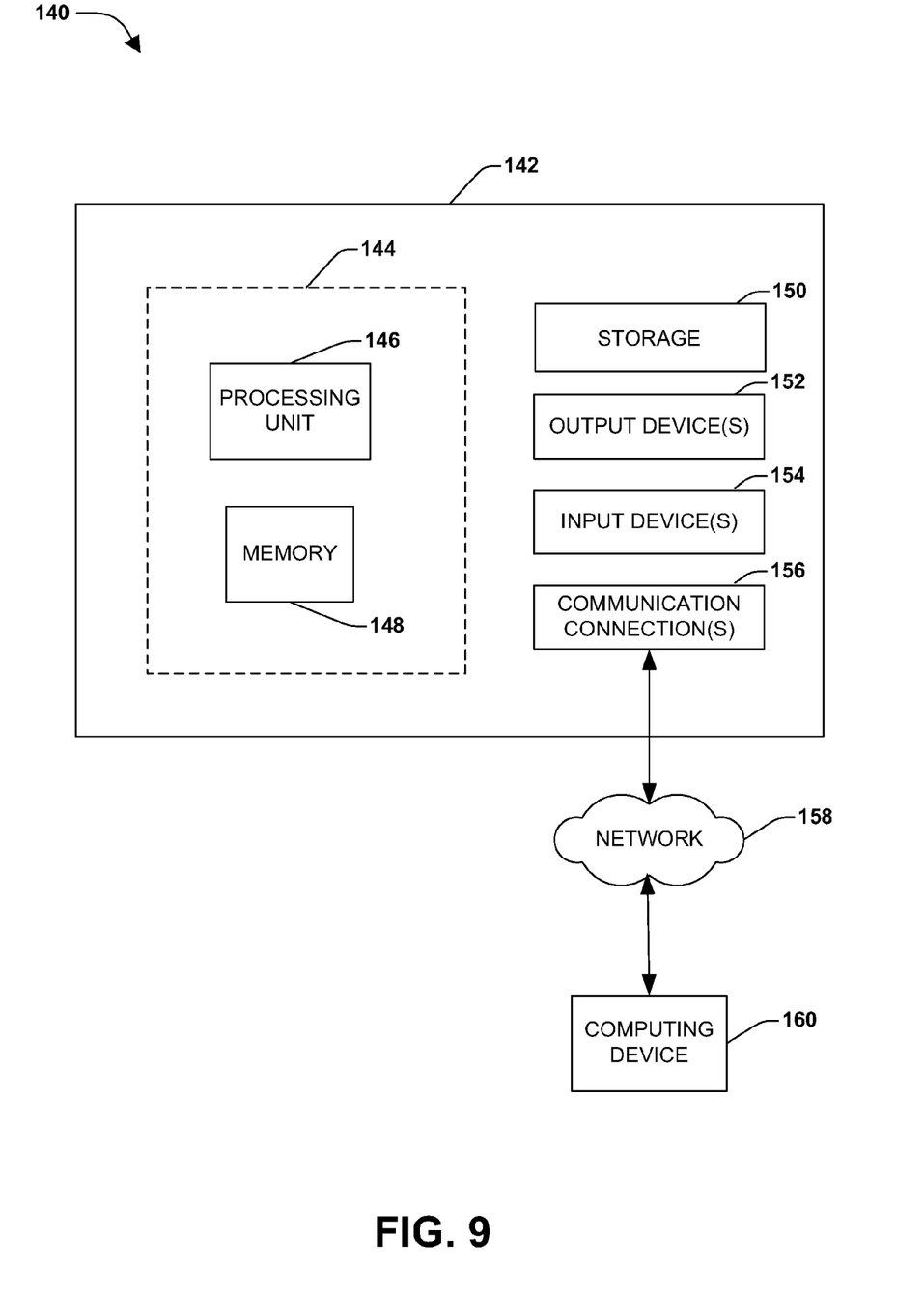
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 9 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 9 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of evaluating an operation comprising instructions to process by a processing engine for a client on a device having a processor, the method comprising:
　executing on the processor instructions to:
　　partition the operation into a partitioned operation having a pre-engine portion executed by the client, a processing engine portion executed by the processing engine, and a post-engine portion executed by the client;
　　after partitioning the operation between a first instruction in the client executed portion and a last instruction in the processing engine portion, adjust the partitioned operation according to at least one instruction adjusting rule by moving at least one instruction other than the first instruction in the client executed portion and the last instruction in the processing engine portion to the other of the processing engine portion and the client executed portion;

execute the pre-engine portion at the client to produce a pre-engine partially executed operation;

send the pre-engine partially executed operation to the processing engine;

receive a processing engine partially executed operation from the processing engine after sending the pre-engine partially executed operation; and execute the post-engine portion of the computing engine partially executed operation at the client to complete the operation execution.

2. The method of claim 1:

the processing engine comprising a relational data query processor, and the operation comprising a relational query targeting data accessible to the relational data query processor.

3. The method of claim 1, the operation comprising a language integrated query specified in a programming language.

4. The method of claim 1, the partitioning comprising:

expanding portions of the partitioned query executed by one of the client and the processing engine, and equivalently compacting portions of the partitioned query executed by the other of the client and the processing engine.

5. The method of claim 4, the partitioning between the client and the processing engine related to at least one of:

processing capacity of the processing engine;
processing capacity of the client;
computational load of the processing engine;
computational load of the client;
storage capacity of the processing engine;
storage capacity of the client; and
communications capacity between the processing engine and the client.

6. The method of claim 1, the partitioning comprising reducing the size of at least one of the pre-engine partially executed operation and the processing engine partially executed operation.

7. The method of claim 1, an instruction adjusting rule comprising:

identifying a compacting instruction in the post-engine portion that compacts the post-engine portion and can be equivalently executed in the processing engine portion, and upon identifying the compacting instruction, moving the compacting instruction to the processing engine portion.

8. A storage device storing instructions to evaluate an operation to process by a processing engine for a client, the instructions comprising:

partitioning the operation into a partitioned operation having a pre-engine portion executed by the client, a processing engine portion executed by the processing engine, and a post-engine portion executed by the client, and after partitioning the operation between a first instruction in the client executed portion and a last instruction in the processing engine portion, adjust the partitioned operation according to at least one instruction adjusting rule by moving at least one instruction other than the first instruction in the client executed portion and the last instruction in the processing engine portion to the other of the processing engine portion and the client executed portion;

executing the pre-engine portion at the client to produce a pre-engine partially executed operation, and executing the post-engine portion of a processing engine partially executed operation at the client to complete the operation execution;

sending the pre-engine partially executed operation produced by the client executed portion execution component to the processing engine, and receiving the processing engine partially executed operation from the processing engine after sending the pre-engine partially executed operation.

9. The system of claim 8, the operation comprising a language integrated query specified in a programming language.

10. The system of claim 8, comprising:

an expression tree transforming component configured to transform the operation into an expression tree before the partitioning.

11. A method of evaluating an operation comprising a language-integrated query to process by a processing engine comprising a relational data query processor for a client on a device having a processor, the method comprising:

executing on the processor instructions to:

transform the operation into an expression tree;

partition the operation into a partitioned operation having a pre-engine portion executed by the client, a processing engine portion executed by the processing engine, and a post-engine portion executed by the client;

expand at least one portion of the partitioned query executed by one of the client and the processing engine, and equivalently compacting portions of the partitioned query executed by the other of the client and the processing engine, related to at least one of:

processing capacity of the processing engine,
processing capacity of the client,
computational load of the processing engine,
computational load of the client,
storage capacity of the processing engine,
storage capacity of the client, and
communications capacity between the processing engine and the client;

after partitioning the operation between a first instruction in the client executed portion a last instruction in the processing engine portion, adjust the partitioned operation according to at least one instruction adjusting rule by moving at least one instruction other than the first instruction in the client executed portion and the last instruction the processing engine portion to the other of the processing engine portion and the client executed portion according to instruction adjusting rules comprising at least one of:

upon identifying a compacting instruction in the post-engine portion that compacts the post-engine portion and be equivalently executed in the processing engine portion, moving the compacting instruction to the processing engine portion;

upon identifying a compacting instruction in the processing engine portion that compacts the processing engine portion and be equivalently executed in the pre-engine portion, moving the compacting instruction to the pre-engine portion;

upon identifying a compacting instruction that compacts the operation, follows a computationally intensive instruction, and be equivalently executed before the computationally intensive instruction, moving the compacting instruction before the computationally intensive instruction;

upon identifying a relocatable instruction in the processing engine component that is preferably executed by the client, follows an unrelocatable instruction that is preferably executed by the processing engine, and be equivalently executed in the pre-engine portion, moving the relocatable instruction into the pre-engine portion;

upon identifying a relocatable instruction in the processing engine component that is preferably executed by the client, is preceded by an unrelocatable instruction that is preferably executed by the processing engine, and be equivalently executed in the post-engine portion, moving the relocatable instruction into the post-engine portion;

upon identifying a relocatable instruction in the pre-engine component that is preferably executed by the processing engine, precedes an unrelocatable instruction that is preferably executed by the client, and be equivalently executed in the processing engine portion, moving the relocatable instruction into the processing engine portion; and upon identifying a relocatable instruction in the post-engine component that is preferably executed by the processing engine, follows an unrelocatable instruction that is preferably executed by the client, and be equivalently executed in the processing engine portion, moving the relocatable instruction into the processing engine portion;

execute the pre-engine portion at the client to produce a pre-engine partially executed operation;

send the pre-engine partially executed operation to the processing engine;

receive a processing engine partially executed operation from the processing engine after sending the pre-engine partially executed operation; and execute the post-engine portion of the computing engine partially executed operation at the client to complete the operation execution.

12. The method of claim 1, sending the pre-engine partially executed operation to the processing engine comprising:

identifying an processing engine expression tree portion comprising a portion of the expression tree to be executed by the processing engine; and sending the pre-engine partially executed operation and the processing engine expression tree portion to the processing engine.

13. The system of claim 8, the processing engine communications component configured to:

identify an processing engine expression tree portion comprising a portion of the expression tree to be executed by the processing engine; and send the pre-engine partially executed operation and the processing engine expression tree portion to the processing engine.

\* \* \* \* \*